United States Patent
Bianchini et al.

(10) Patent No.: US 12,552,682 B2
(45) Date of Patent: Feb. 17, 2026

(54) PROCESS FOR MAKING AN ELECTRODE ACTIVE MATERIAL, AND ELECTRODE ACTIVE MATERIAL

(71) Applicants: BASF SE, Ludwigshafen (DE); KARLSRUHER INSTITUT FUR TECHNOLOGIE, Karlsruhe (DE)

(72) Inventors: Matteo Bianchini, Ludwigshafen am Rhein (DE); Pascal Hartmann, Ludwigshafen am Rhein (DE); Torsten Brezesinski, Eggenstein-Leopoldshafen (DE); David Kitsche, Eggenstein-Leopoldshafen (DE); Jurgen Janek, Gießen (DE)

(73) Assignees: BASF SE, Ludwigshafen am Rhein (DE); KARLSRUHER INSTITUT FUR TECHNOLOGIE, Karlsruhe (DE)

( * ) Notice: Subject to any disclaimer, the term of this patent is extended or adjusted under 35 U.S.C. 154(b) by 598 days.

(21) Appl. No.: 17/758,742

(22) PCT Filed: Feb. 18, 2021

(86) PCT No.: PCT/EP2021/054030
§ 371 (c)(1),
(2) Date: Jul. 13, 2022

(87) PCT Pub. No.: WO2021/170483
PCT Pub. Date: Sep. 2, 2021

(65) Prior Publication Data
US 2023/0002242 A1    Jan. 5, 2023

(30) Foreign Application Priority Data

Feb. 27, 2020 (EP) .................. 20159666

(51) Int. Cl.
*C01G 53/42* (2025.01)
*C01G 53/82* (2025.01)

(52) U.S. Cl.
CPC ........... *C01G 53/42* (2013.01); *C01G 53/82* (2025.01); *C01P 2006/40* (2013.01)

(58) Field of Classification Search
CPC ........ C01G 53/42; C01G 53/82; C01G 53/00; C01P 2006/40; C01P 2002/52; C01P 2002/54; C01P 2004/61; C01P 2006/12; H01M 2004/028; H01M 4/131; H01M 4/525; H01M 4/621; H01M 4/625; H01M 10/0525; Y02E 60/10
See application file for complete search history.

(56) References Cited

U.S. PATENT DOCUMENTS

| | | | | |
|---|---|---|---|---|
| 5,750,288 A | * | 5/1998 | Xie | H01M 4/525 429/223 |
| 7,135,251 B2 | * | 11/2006 | Cho | H01M 4/366 429/231.1 |
| 2012/0292561 A1 | * | 11/2012 | Sasaoka | C01G 53/50 252/182.1 |
| 2017/0301909 A1 | * | 10/2017 | Lee | H01M 4/366 |
| 2018/0151874 A1 | * | 5/2018 | Kim | H01M 4/36 |
| 2018/0316010 A1 | * | 11/2018 | Nakayama | H01M 4/505 |
| 2020/0036006 A1 | * | 1/2020 | Choi | H01M 4/364 |

FOREIGN PATENT DOCUMENTS

| | | |
|---|---|---|
| CN | 106784720 A | 5/2017 |
| JP | H08321299 A | 12/1996 |
| JP | H09153360 A | 6/1997 |
| JP | H09274917 A | 10/1997 |
| JP | H10106562 A | 4/1998 |
| JP | 10106562 A * | 9/1998 |
| JP | 2019138565 A | 8/2019 |

OTHER PUBLICATIONS

International Search Report dated Apr. 12, 2021, PCT/EP2021/054030.

* cited by examiner

*Primary Examiner* — Daniel S Gatewood
(74) *Attorney, Agent, or Firm* — Armstrong Teasdale LLP

(57) ABSTRACT

Process for making an electrode active material wherein said process comprises the following steps: (a) Providing a hydroxide $TM(OH)_2$ or at least one oxide TMO or oxyhydroxide of TM or combination of at least two of the foregoing wherein TM contains at least 99 mol-% Ni and, optionally, in total up to 1 mol-% of at least one metal selected from Ti, Zr, V, Co, Zn, Ba, or Mg, (b) mixing said hydroxide $TM(OH)_2$ or oxide TMO or oxyhydroxide of TM or combination with a source of lithium and an aqueous solution of a compound of Me wherein Me is selected from Al or Ga or a combination of the foregoing and wherein the molar amount of TM corresponds to the sum of Li and Me, (c) removing the water by evaporation, (d) treating the solid residue obtained from step (c) thermally at a temperature in the range of from 500 to 800° C. in the presence of oxygen.

6 Claims, No Drawings

PROCESS FOR MAKING AN ELECTRODE ACTIVE MATERIAL, AND ELECTRODE ACTIVE MATERIAL

This application is a national stage filing under 35 U.S.C. § 371 of International Application No. PCT/EP2021/054030, filed on Feb. 18, 2021, which claims priority to EP Application Serial No. 20159666.5, filed on Feb. 27, 2020; the contents of each are incorporated herein by reference in their entirety.

The present invention is directed towards a process for making an electrode active material wherein said process comprises the following steps:
- (a) Providing a hydroxide $TM(OH)_2$ or at least one oxide TMO or at least one oxyhydroxide of TM or a combination of at least two of the foregoing wherein TM contains at least 99 mol-% Ni and, optionally, in total up to 1 mol-% of at least one metal selected from Ti, Zr, V, Co, Zn, Ba, or Mg,
- (b) mixing said hydroxide $TM(OH)_2$ or oxide TMO or oxyhydroxide of TM or combination with a source of lithium and an aqueous solution of a compound of Me wherein Me is selected from Al or Ga or a combination of the foregoing and wherein the molar amount of TM corresponds to the sum of Li and Me,
- (c) removing the water by evaporation,
- (d) treating the solid residue obtained from step (c) thermally at a temperature in the range of from 500 to 800° C. in the presence of oxygen.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mol-% or more of Ni, referring to the total TM content.

A particularly Ni-rich material is $LiNiO_2$, sometimes abbreviated as LNO. However, pure LNO suffers from various drawbacks that have lowered interest in its commercial use. The most important among these drawbacks is the difficile synthesis of stoichiometric $LiNiO_2$ due to its tendency towards Li off-stoichiometry ($Li_{1-z}Ni_{1+z}O_2$) and various instability problems of its delithiated state, which can be of (electro)chemical, mechanical or thermal nature.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process". The inventive process comprises the following steps:
- (a) Providing a hydroxide $TM(OH)_2$ or at least one oxide TMO or at least one oxyhydroxide of TM or a combination of at least two of the foregoing wherein TM contains at least 99 mol-% Ni and, optionally, in total up to 1 mol-% of at least one metal selected from Ti, Zr, V, Co, Zn, Ba, or Mg,
- (b) mixing said hydroxide $TM(OH)_2$ or oxide TMO or oxyhydroxide of TM or combination with a source of lithium and an aqueous solution of a compound of Me wherein Me is selected from Al or Ga or a combination of the foregoing and wherein the molar amount of TM corresponds to the sum of Li and Me,
- (c) removing the water by evaporation,
- (d) treating the solid residue obtained from step (c) thermally at a temperature in the range of from 500 to 800° C. in the presence of oxygen.

The inventive process comprises four steps, (a), (b), (c), and (d), in the context of the present invention also referred to as step (a) and step (b) and step (c) and step (d), respectively. The four steps are preferably performed subsequently.

The inventive process starts off from a hydroxide $TM(OH)_2$ or at least one oxide TMO or at least one oxyhydroxide of TM or a combination of at least two of the foregoing. In such hydroxide $TM(OH)_2$ or at least one oxide TMO or oxyhydroxide of TM, TM contains at least 99 mol-% Ni and, optionally, in total up to 1 mol-% of at least one metal selected from Ti, Zr, V, Co, Zn, Ba, or Mg. Preferably, TM contains at least 99.5 mol-% of Ni and, optionally, in total up to 0.5 mol-% of at least one metal selected from Ti, Zr, and Co, and only traces of V, Zn, Ba, and Mg. Even more preferably, TM is Ni. The amount and kind of metals such as Ti, Zr, V, Co, Zn, Ba, or Mg may be determined by inductively coupled plasma ("ICP") spectroscopy and by synchrotron XRD.

$TM(OH)_2$ or TMO or oxyhydroxide of TM provided in step (a) is preferably comprised of spherical particles, referring to particles that have a spherical shape. Spherical particles shall include not just those which are exactly spherical but also those particles in which the maximum and minimum diameter of at least 90% (number average) of a representative sample differ by not more than 10%.

In one embodiment of the present invention, $TM(OH)_2$ or TMO or oxyhydroxide of TM provided in step (a) is comprised of secondary particles that are agglomerates of primary particles. Preferably, $TM(OH)_2$ or TMO or oxyhydroxide of TM provided in step (a) is comprised of spherical secondary particles that are agglomerates of primary particles. Even more preferably, $TM(OH)_2$ or TMO or oxyhydroxide of TM provided in step (a) is comprised of spherical secondary particles that are agglomerates of spherical primary particles or platelets.

In one embodiment of the present invention, $TM(OH)_2$ or TMO or oxyhydroxide of TM provided in step (a) has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material.

In embodiments wherein TM contain at least 99 mol-% Ni and in total up to 1 mol-% of at least one metal selected from Ti, Zr, V, Co, Zn, Ba, or Mg, said Ti, Zr, V, Co, Zn, Ba, or Mg or combinations of at least two of the foregoing may be homogeneously distributed within the particles of $Ni(OH)_2$ or enriched at the surface, preference being giving to a homogeneous distribution.

$TM(OH)_2$ as provided in step (a) may be manufactured by precipitation of Ni and—if applicable—in total up to 1 mol-% of at least one metal selected from Ti, Zr, V, Co, Zn, Ba, or Mg with alkali metal hydroxide from an aqueous solution of nickel sulfate that contains, if desired, at least one compound of said metal(s) selected from Ti, Zr, V, Co, Zn, Ba, or Mg, followed by filtration and drying.

TMO and oxyhydroxide of TM as provided in step (a) may be manufactured by heating $TM(OH)_2$, thus removing water.

Oxyhydroxide of TM is meant to include non-stoichiometric oxyhydroxides, with water bound chemically as hydroxide or with residual moisture content.

In step (b), said hydroxide $TM(OH)_2$ or oxide TMO or oxyhydroxide of TM or combination provided in step (a) is mixed with a source of lithium and an aqueous solution of a compound of Me wherein Me is selected from Al or Ga or a combination of the foregoing, for example in a molar ratio of Al to Ga in the range of from 1:10 to 10:1. Preferably, Me is Ga.

Examples of sources of lithium are inorganic compounds of lithium, for example $LiNO_3$, $Li_2O$, LiOH and $Li_2CO_3$, preference being given to $Li_2O$, LiOH and $Li_2CO_3$, water of crystallization being neglected in the context of the source of lithium, and even more preference being given to LiOH.

In step (b), the molar amount of TM corresponds to the sum of Li and Me which means the sum of molar amounts of Li and Me. In embodiments wherein Me is Ga, the molar amount of TM corresponds to the molar sum of Li and Ga.

In a preferred embodiment, the molar amount x of Me in step (b) corresponds to $0.00 < x \leq 0.05$ and the amount of Li corresponds to 1−x.

Compound(s) of Me are preferably water-soluble, that means that their solubility in water is at least 50 g/l at ambient temperature. If the solubility is lower, for example 20 g/l or less, a lot of water has to be removed in step (c) which makes the inventive process more expensive.

In step (b), suitable counterions of compound(s) of Me are of the type that they are removed during step (c) or (d), for example the acetates. In one embodiment of step (b), the compound(s) of Me are the nitrate(s).

Step (b) may be performed as one operation but it is preferred that step (b) comprises the sub-steps (b1) of mixing $TM(OH)_2$ or TMO or oxyhydroxide of TM or combination with a source of lithium followed by sub-step (b2) of addition of a solution of compound of Me. Said sub-steps shall be described in more detail below.

Sub-step (b1) may be performed by mixing hydroxide $TM(OH)_2$ or TMO or oxyhydroxide of TM or combination in a mixer, for example in a plough-share mixer or in a tumble mixer. For laboratory scale experiments, ball mills and roller mills may be applied as well.

Sub-step (b1) may be performed with the addition of water or of an organic solvent, but it is preferred to not add any organic solvent or water in sub-step (b1).

Preferred duration of sub-step (b1) is in the range of from one to 30 minutes.

A mixture is obtained from sub-step (b1).

It is possible to perform sub-step (b1) under heating, but it is preferred to not perform additional heating in the course of step (b1).

Subsequently to sub-step (b1), sub-step (b2) is performed. In sub-step (b2), an aqueous solution of compound of Me is added to the mixture.

In one embodiment of the present invention, said aqueous solution has a concentration of Me in the range of from 0.3 to 1.5 mol/l, corresponding to a mass concentration from 76.2 g/l to 383.6 g/L of nitrate of Me in water in case the nitrate is selected, preferably of $Ga(NO_3)_3$ in water.

In one embodiment of the present invention, sub-step (b2) is performed in a way that the volume of mixture of $TM(OH)_2$ or TMO or oxyhydroxide of TM and of the source of lithium exceeds the volume of aqueous solution of compound of Me, for example in a ratio of 2:1 to 20:1, preferably 3:1 to 10:1.

It is possible to perform sub-step (b2) under heating, but it is preferred to perform step (b2) at ambient temperature.

It is preferred that the water hardness of said aqueous solution used in step (b2) is at least partially removed, especially the calcium. The use of desalinized water is preferred.

In one embodiment of the present invention, sub-step (b2) is performed at a temperature in the range of from 5 to 85° C., preferred are 10 to 60° C.

In one embodiment of the present invention, sub-step (b2) is performed at normal pressure. It is preferred, though, to perform sub-step (b2) under elevated pressure, for example at 10 mbar to 10 bar above normal pressure, or with suction, for example 50 to 250 mbar below normal pressure, preferably 100 to 200 mbar below normal pressure.

Sub-step (b2) may be supported by mixing operations, for example shaking or in particular by stirring or shearing.

In one embodiment of the present invention, subs-step (b2) has a duration in the range of from 1 minute to 30 minutes, preferably 1 minute to less than 5 minutes.

In one embodiment of the present invention, sub-step (b2) is performed by charging a vessel with mixture of $TM(OH)_2$ or oxide TMO or oxyhydroxide of TM and with source of lithium and then adding aqueous solution of compound of Me.

In a preferred embodiment, sub-steps (b1) and (b2) are performed in the same vessel.

A slurry or paste is obtained from sub-step (b2) and thus from step (b).

In one embodiment of the present invention, stirring in step (b) —and (c), if applicable—is performed with a rate in the range of from 1 to 50 revolutions per minute ("rpm"), preferred are 5 to 20 rpm.

In step (c), water is removed by evaporation. Step (c) may be performed in vacuo, for example at a pressure in the range of from 5 to 100 mbar, or under a flow of gas. Such gas may be selected from air, nitrogen, oxygen, or the like.

In one embodiment of the present invention, step (c) is performed at a temperature in the range of from 150 to 500° C., preferably 200 to 450° C. The duration at said temperature may be in the range of from 6 to 24 hours. A heating rate in the range of from 1 to 10° C./min is preferred.

In a preferred embodiment of the present invention, step (c) is performed under an atmosphere of nitrogen or air or oxygen.

A solid residue is obtained from step (c). Said solid residue may contain residual moisture.

In one embodiment of the present invention, steps (c) and (d) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (c) and (d) under an atmosphere with a carbon dioxide content below detection limit for example with infrared light-based optical methods.

The inventive process includes a subsequent step (d):

(d) thermal treatment of the solid residue obtained from step (c) at a temperature in the range of from 500 to 800° C., preferably 650 to 750° C., in the presence of oxygen.

Step (d) may be carried out in any type of oven, for example a roller hearth kiln, a pusher kiln, a rotary kiln, a pendulum kiln, or—for lab scale trials—in a muffle oven.

The temperature of 500 to 800° C. corresponds to the maximum temperature of step (d).

It is possible to subject the material obtained from step (c) directly to step (d). However, it is preferred to increase the temperature stepwise, or to ramp up the temperature. Said step-wise increase or ramping up may be performed under normal pressure or reduced pressure, for example 1 to 500 mbar.

Step (d) —at its maximum temperature—may be performed under normal pressure.

Step (d) is carried out under an oxygen-containing atmosphere, for example air, oxygen-enriched air or pure oxygen.

In one embodiment of the present invention, step (d) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (d) under an atmosphere with a carbon dioxide content below detection limit for example with infrared light-based optical methods.

By carrying out the inventive process, electrode active materials are obtained with excellent electrochemical properties. Without wishing to be bound by any theory, we assume that the element Me is incorporated in the lithium layer.

A further aspect of the present invention relates to an electrode active material, hereinafter also referred to as inventive electrode active material. Inventive electrode active material is in particulate form and has the general formula $Li_{1-x}TMMe_xO_2$, wherein TM contains at least 99 mol-% Ni and, optionally, up to 1 mol-% of at least one metal selected from Ti, Zr, V, Co, Zn, Ba, or Mg. Preferably, TM contains at least 99.5 mol-% of Ni and, optionally, in total up to 0.5 mol-% of at least one metal selected from Ti, Zr, and Co, and only traces of V, Zn, Ba, and Ca. Even more preferably, TM is Ni.

Me is selected from Ga and Al and combinations of the foregoing, preferred is Ga, and $0.00 < x \leq 0.05$.

In embodiments wherein TM contain at least 99 mol-% Ni and in total up to 1 mol-% of at least one metal selected from Ti, Zr, V, Co, Zn, Ba, or Mg, said Ti, Zr, V, Co, Zn, Ba, or Mg or combinations of at least two of the foregoing may be homogeneously distributed within the particles of $Ni(OH)_2$ or enriched at the surface, preference being giving to a homogeneous distribution In one embodiment of the present invention inventive electrode active materials have an average particle diameter (D50) in the range of from 3 to 20 μm, preferably from 5 to 16 μm. The average particle diameter may be determined, e.g., by light scattering or LASER diffraction or electroacoustic spectroscopy. The particles are usually composed of agglomerates from primary particles, and the above particle diameter refers to the secondary particle diameter.

In one embodiment of the present invention inventive electrode active materials have a specific surface (BET) in the range of from 0.1 to 2.0 $m^2/g$, determined according to DIN-ISO 9277:2003-05.

A further aspect of the present invention refers to electrodes comprising at least one electrode active material according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Specifically, inventive cathodes contain
(A) at least one inventive electrode active material,
(B) carbon in electrically conductive form,
(C) a binder material, also referred to as binders or binders (C), and, preferably,
(D) a current collector.

In a preferred embodiment, inventive cathode contain
(A) 80 to 98% by weight inventive electrode active material,
(B) 1 to 17% by weight of carbon,
(C) 1 to 15% by weight of binder material, percentages referring to the sum of (A), (B) and (C).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (B). Carbon (B) can be selected from soot, active carbon, carbon nanotubes, graphene, and graphite, and from combinations of at least two of the foregoing.

Suitable binders (C) are preferably selected from organic (co)polymers. Suitable (co)polymers, i.e., homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol-% of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and are preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

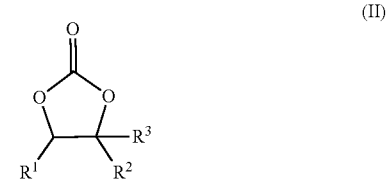

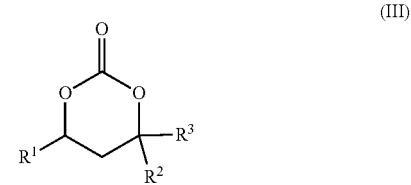

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range of from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example, cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General remarks: N-methyl-2-pyrrolidone: NMP.

I. Synthesis of a Cathode Active Material

I.1 Step (a.1): Synthesis of a Precursor $Ni(OH)_2$

Precipitation of Nickel Hydroxide (Precursor):

Precipitation of nickel hydroxide was performed at 55° C. under a nitrogen atmosphere using a continuously stirred tank reactor with a volume of 2.3 l. Aqueous solutions of nickel sulfate, ammonia and sodium hydroxide were fed into the reactor. The individual flow rates were adjusted to ensure a pH value of 12.6 (plus/minus 0.2), a molar ratio of nickel to ammonia of 0.8 and a residence time of around 8 hours. The solid so obtained was removed by filtration, washed with deionized water for 12 hours and dried at 120° C. for 16 hours. Nickel hydroxide powder, $Ni(OH)_2$ was obtained, with an average secondary particle diameter (D50) of 15 μm.

I.2 Conversion of $Ni(OH)_2$ into Cathode Active Materials

I.2.1 Step (b.1), General Procedure $Ni(OH)_2$ from step (a.1) and $LiOH·H_2O$ were mixed in a mixer for 3 minutes in a molar ratio of 1.0:0.96. An aqueous solution of the Ga precursor $(Ga(NO_3)_3·nH_2O)$ was made and added to the mixture of Ni and Li hydroxides (typically 2.5 ml deionized water per 10 g total precursor mass). The amount of Ga was chosen to be in a molar ratio of x to 1.0, referring to Ni. In the case of step (b.1), x was set to 0.01. The resulting suspension was stirred for one minute using a spatula.

I.2.2 Steps (c.1) to (d.1)

In steps (b.1) and (c.1), both the heating and the cooling rate were set to 3° C./min.

Step (c.1): The suspension from step (b.1) was heated to 300° C. and then maintained at 300° C. for 15 hours. Step (c.1) was conducted in argon flow (4 exchanges of the reactor atmosphere per hour). The residue was cooled to ambient temperature and homogenized in a mortar.

Step (d.1): The homogenized residue from step (c.1) was subjected to calcination in $O_2$ flow (4 exchanges of the reactor atmosphere per hour) at 700° C. for 10 hours. Inventive CAM.1 was obtained.

In the case of comparative material C-CAM.0, no gallium nitrate was added.

II. Testing of Cathode Active Material

II.1 Electrode Manufacture, General Procedure

Positive electrode: PVDF binder (Solef® 5130) was dissolved in NMP (Merck) to produce a 7.5 wt. % solution. For electrode preparation, binder solution (3 wt. %) and carbon black (Super C65, 3 wt.-%) were suspended in NMP. After mixing using a planetary centrifugal mixer (ARE-250, Thinky Corp.; Japan), inventive CAM (or comparative CAM) (94 wt. %) was added and the suspension was mixed again to obtain a lump-free slurry. The solid content of the slurry was adjusted to 61%. The slurry was coated onto Al foil using a KTF-S roll-to-roll coater (Mathis AG). Prior to use, all electrodes were calendared. The thickness of cathode material was 100 μm, corresponding to 6.5 mg/cm². All electrodes were dried at 105° C. for 7 hours before battery assembly.

II.2 Electrolyte Manufacture

A base electrolyte composition was prepared containing 1 M $LiPF_6$ in 3:7 by weight ethylene carbonate and ethyl methyl carbonate (EL base 1).

II.3 Test Cell Manufacture

Coin-type half cells (20 mm in diameter and 3.2 mm in thickness) comprising a cathode prepared as described under II.1 and lithium metal as working and counter electrode, respectively, were assembled and sealed in an Ar-filled glove box. In addition, the cathode and anode and a separator were superposed in order of cathode/separator/Li foil to produce a half coin cell. Thereafter, 0.15 ml of EL base 1, which is described above (II.2), were introduced into the coin cell.

III. Evaluation of Cell Performance

Evaluation of Coin Half-Cell Performance

Cell performance were evaluated using the produced coin type battery. For the battery performances, initial capacity and reaction resistance of cell were measured.

Cycling data were recorded at 25° C. using a MACCOR Inc. battery cycler. For ten initial cycles, cells were galvanostatically charged to 4.3 V vs $Li^+/Li$, followed by 15 min of potentiostatic charging (or a shorter period if the charging current dropped below C/20), and discharged to 3.0 V vs $Li^+/Li$ at a rate of C/10 (1C=225 $mA/g_{CAM}$). For 100 additional cycles the charging and discharging rates were set to C/4 and C/2, respectively, and the length of the potentiostatic step at 4.3 V vs $Li^+/Li$ was set to 10 min. The results are summarized in Table 1.

TABLE 1

Discharge Capacities (DC) for different cycle numbers

| CAM | x | $1^{st}$ cyc. DC | Max. DC | $10^{th}$ cyc. DC | $11^{th}$ cyc. DC | $110^{th}$ cyc. DC | Cap. Ret. $11^{th}$-$110^{th}$ cyc. [%] |
|---|---|---|---|---|---|---|---|
| C-CAM.0 | 0.00 | 233.0 | 233.0 | 215.2 | 188.1 | 84.1 | 44.7 |
| CAM.1 | 0.01 | 225.5 | 225.5 | 204.0 | 175.2 | 80.4 | 45.9 |
| CAM.2 | 0.02 | 224.2 | 224.8 | 211.8 | 190.3 | 131.3 | 69.0 |
| CAM.3 | 0.03 | 224.2 | 221.7 | 210.9 | 189.4 | 134.0 | 70.7 |
| CAM.4 | 0.04 | 203.7 | 216.0 | 209.6 | 188.7 | 147.9 | 78.4 |
| CAM.5 | 0.05 | 190.0 | 208.9 | 204.8 | 183.4 | 139.1 | 75.8 |

10 cycles at C/10; afterwards charging at C/4 and discharging at C/2. Max. DC refers to the highest recorded discharge capacity. The percentages denoting the samples refer to the nominal degree of Li substitution by Ga (Me), i.e. x from 0.00 to 0.05 in $Li_{1-x}NiGa_xO_2$ refers to 0 to 5% nominal doping. All values in mA·h/g unless specifically noted otherwise.

The invention claimed is:

1. A process for making an electrode active material comprising:
    (a) providing a hydroxide $TM(OH)_2$ or at least one oxide TMO or at least one oxyhydroxide of TM or a combination of at least two of the foregoing, wherein TM contains at least 99 mol-% Ni and, optionally, in total up to 1 mol-% of at least one metal selected from Ti, Zr, V, Co, Zn, Ba, or Mg,
    (b) mixing the hydroxide $TM(OH)_2$ or oxide TMO or oxyhydroxide of TM or combination with a source of lithium, and an aqueous solution of a compound of Me, wherein Me is selected from Al or Ga or a combination of the foregoing and wherein a molar amount of TM corresponds to a sum of Li and Me,
    (c) removing water by evaporation, and
    (d) treating a solid residue obtained from step (c) thermally at a temperature ranging from 500 C to 800° C. in the presence of oxygen.

2. The process according to claim 1, wherein step (c) is performed at a temperature ranging from 150° C. to 500° C.

3. The process according to claim 1, wherein in step (b), the compound(s) of Me are nitrate(s).

4. The process according claim 1, wherein step (b) comprises sub-steps (b1) of mixing $TM(OH)_2$ or oxide TMO or oxyhydroxide of TM or combination of at least two of the foregoing with a source of lithium followed by sub-step (b2) adding a solution of compound of Me.

5. The process according to claim 1, wherein a molar amount x of Me corresponds to 0.00<x≤0.05 and an amount of Li corresponds to 1−x.

6. The process according to claim 1, wherein Me is gallium.

* * * * *